United States Patent [19]

Egnell

[11] 4,333,958
[45] Jun. 8, 1982

[54] METHOD FOR THE MANUFACTURE OF WHEY PRODUCTS

[75] Inventor: Eric R. Egnell, Tyresö, Sweden

[73] Assignee: Nedre Norrlands Producentforening ek. for, Bangardsgatan, Ostersund, Sweden

[21] Appl. No.: 198,361

[22] Filed: Oct. 20, 1980

Related U.S. Application Data

[63] Continuation-in-part of Ser. No. 952,934, Oct. 20, 1978, Pat. No. 4,253,386.

[30] Foreign Application Priority Data

Oct. 28, 1977 [SE] Sweden .............................. 7712167

[51] Int. Cl.³ ............................................. A23C 21/00
[52] U.S. Cl. .................................... 426/583; 426/41; 426/603; 426/582
[58] Field of Search .................. 426/583, 582, 41, 36, 426/663, 664, 491, 603; 99/452, 453, 483

[56] References Cited

U.S. PATENT DOCUMENTS

| | | | |
|---|---|---|---|
| 2,119,614 | 6/1938 | Webb et al. | 426/583 |
| 2,336,461 | 12/1943 | Beardslee | 426/583 |
| 2,555,514 | 6/1951 | Sharp et al. | 426/583 |
| 2,930,696 | 3/1960 | Rodgers et al. | 426/583 |
| 4,057,655 | 11/1977 | Okada et al. | 426/583 |
| 4,166,142 | 8/1979 | Chang | 426/583 |

Primary Examiner—Raymond N. Jones
Assistant Examiner—George C. Yeung

[57] ABSTRACT

The production of whey products such as whey butter and whey cheese is effected by first concentrating raw whey to a total solids content of 40 to 80% by weight, thereafter adding non-heat sensitive raw materials and adjusting the pH thereof to a value of between 5.8 and 6.8. The concentrate is thereafter heated in order to precipitate the whey proteins therefrom and kept at a predetermined elevated temperature for a period of time in order to insure the quality of the product. Heat sensitive additives are thereafter added and finally the mixture is homogenized or comminuted by other means. The product is cooled and thereafter stored until a suitable consistency is obtained.

4 Claims, 1 Drawing Figure

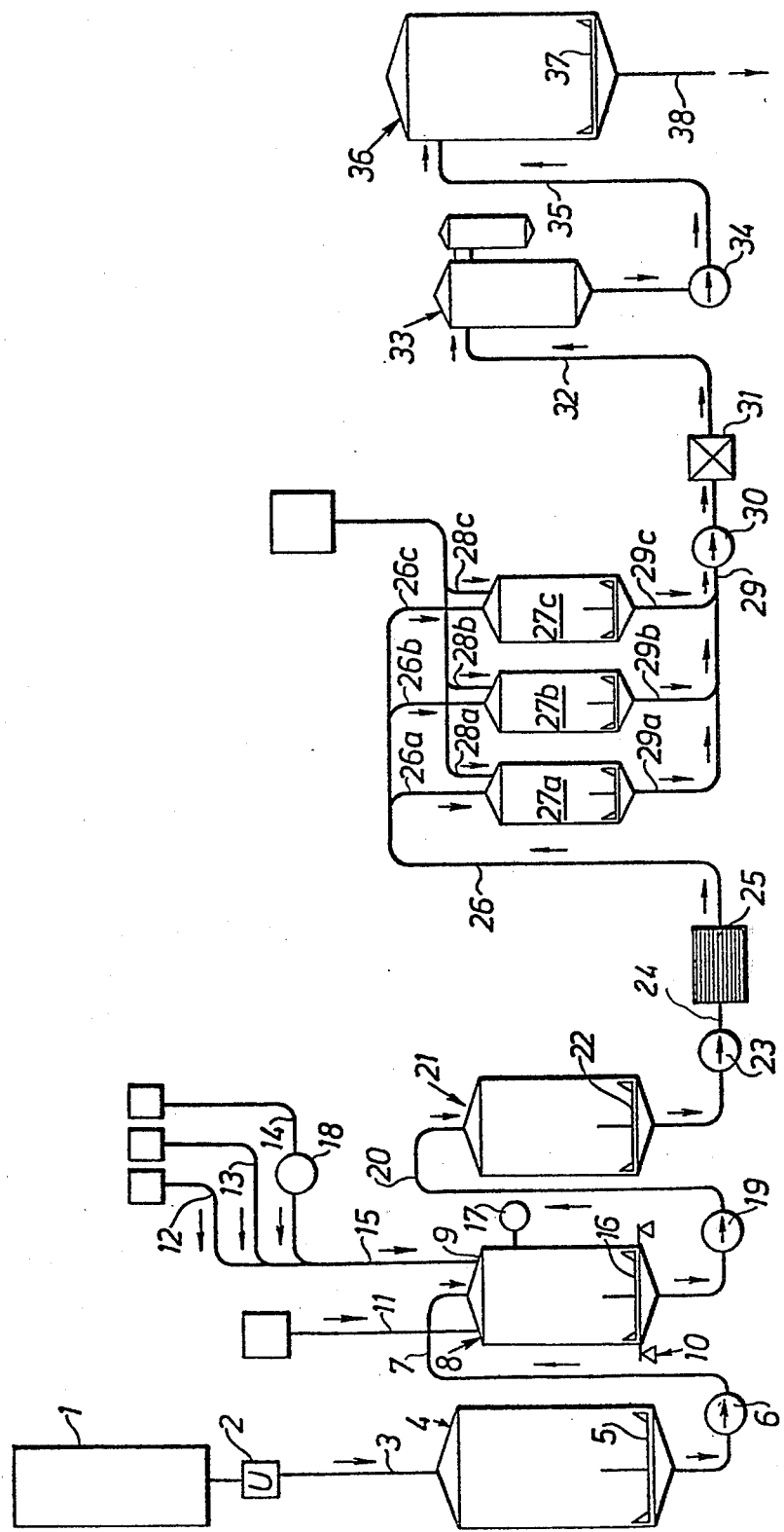

METHOD FOR THE MANUFACTURE OF WHEY PRODUCTS

RELATED APPLICATION

This is a continuation-in-part of application Ser. No. 952,934, filed Oct. 20, 1978, now U.S. Pat. No. 4,253,386.

The present invention relates to a procedure and a device for manufacture of whey products. By whey butter and whey cheese is meant a product obtained by concentration of whey made from cow's or goat's milk, with or without addition of milk constituents and other sugar species than lactose.

Whey products, chiefly whey-cheese and whey-butter, have for a long time been made on farms and shieldings. For this production whey is evaporated in open vessels and to the resulting more concentrated whey can be added cream, milk, sugar or different flavourings. Depending on the desired final product the evaporation is continued for different lengths of time, after which the contents of the vessel are left to cool into finished product.

Characteristic of this manufacture is that it is done batchwise and that the various phases of the process—evaporation, browning, cooling—more or less overlap.

The present commercial production technique, too, is based on batchwise production, whereas a stricter division has been made between the various phases of the process. Thus, in modern whey-pans the evaporation of the whey concentrate is done under vacuum. By this means the boiling point of the concentrate is lowered owing to the lower pressure of evaporation. The lower temperature prevents overheating and too strong browning of the product during the evaporation. If stronger browning is desired, i.e. a darker colour of the product, the process can continue under the desired pressure in the same pan. The product is finally cooled in separate coolers.

The modern batchwise manufacture of whey products is thus done by a procedure comprising the following stages:

(1) Concentration of whey by evaporation, either in conventional single- or multistage evaporators, to a total solids (T.S.) content of 35–45%.

(2) Adjustment of the degree of acidity to a desired °Th value (°Th signifies Thörner degrees, an acidity measure customarily used in the dairy industry). This value varies for different T.S. contents in the concentrated whey.

(3) Precipitation of whey proteins by heating to boiling point at atmospheric pressure.

(4) Concentration by evaporation to desired T.S. content, which for whey-butter is 52–62% and for whey-cheese 77–83%.

(5) "Browning", i.e. heating at about 100° C. until the desired color and taste are obtained.

(6) Homogenizing, i.e. powerful mechanical working of the mixture if the product is whey-butter or less powerful working if the product is whey-cheese.

(7) Cooling. Whey-butter is cooled down to 15°–20° C., at which temperature it is still fairly fluid. Cooling of the product for making whey-cheese is usually done in two stages, the product being cooled in the first stage to a temperature at which it is still fluid.

(8) The product is drawn into aluminium molds and cooled in a refrigerating room. The cheese is then released from the mold and packed after being cut to size.

This procedure has several disadvantages. It is laborious and requires special proficiency on the part of the operators. The many batches resulting from batchwise manufacture make it difficult or impossible to exercise accurate supervision and rational regulation of the process in order to attain the correct consistency, taste and color of the product. This is a great disadvantage, as these variables constitute the chief criteria of the quality of the product. Concentration by evaporation in vacuum pans is uneconomical since it requires large specific quantities of energy.

The apparatus used for the batchwise manufacture is not suited for automatic cleaning. The vacuum pans, moreover, are large, take up much space, and have a high noise level, chiefly because of the scrapers with which they are equipped. The working environment is also impaired by the large quantities of steam formed by boiling in open pans.

The invention provides for a continuous production process for manufacture of whey products, the process being divided into specific stages and so allowing good supervision and control. The input of raw materials and output of end-product take place continuously, while certain substages in the manufacture may be intermittent or consist of alternative flow paths for the mixture.

The starting materials for manufacture of the whey products, i.e. whey butter or whey cheese, generally are as follows:

Concentrated whey
Sugar—sorbitol
Fat
pH-adjusting means (agent) The temperature of the mixture should be about +40°–70° C. Useful heat-sensitive additives in the form of iron preparation (e.g. ferro-gluconate), preservatives e.g. potassium sorbate, tasting additives in the form of e.g. vanilla sugar, are examples of additives of this kind which are to be incorporated following the precipitation of the whey proteins.

To attain the desired supervision and control of the process, a new method of precipitation of proteins has been devised in the procedure according to the invention. In the conventional procedure the acidity of the whey concentrated to 35–45% T.S. is adjusted with NaOH or $Na_2CO_3$ to 55° Th before precipitation of the whey protein. But it has been found that measurement of the acidity by the Thörner method is not appropriate for automation of the process. Adjustment of the acidity to an appropriate pH-value gives a better result and permits the introduction of advanced measuring and dispensing equipment.

These disadvantages of batchwise manufacture of whey products are eliminated and a continuous procedure, permitting good control and supervision of the manufacturing process, is attained according to the invention by first increasing the total solids content by evaporation of whey in several stages to a content of 40–80 percentage by weight, preferably 54–58% (T.S.) for whey butter production, proportioning and adding non-heat-sensitive raw materials, and adjusting the acidity of the concentrate-raw material to a predetermined value by addition of a pH-regulating agent of food quality (e.g., 20% NaOH) to a pH-value between 5.8 and 6.8, preferably between 5.8 and 6.2, the temperature of the concentrate being generally between 55° and 60° C.

The mixture is then heated to a temperature between 85° and 140° C., preferably between 96° and 100° C., in order to precipitate whey proteins and to effect "browning" of the composition; the mixture is kept at a predetermined temperature for a predetermined time in order to ensure the quality of the product, after which heat-sensitive additives, such as flavoring agents and preservatives, are added to the concentrate. Finally, the mixture, chiefly the precipitated proteins, is homogenized or comminuted by other means, e.g., by mechanical processing of predetermined intensity, the product is cooled down to a temperature below 30° C., preferably to between 15° and 20° C., in the case of whey butter production, and is stored in a product container in order to give it a suitable consistency.

It is advantageous that proportioning and addition of non-heat-sensitive raw materials should be done by continuous dispensing or batchwise by means of an intermittent weighing process between, before or after continuous processes in the process chain.

Other advantages are obtained by arranging a hot-holding period by alternate feed of the mixture into at least two holding tanks, preferably with agitator, the mixture exhibiting essentially constant volume flow, or by pumping the mixture through a continuously functioning holder cell.

Finally it is advantageous at the invention that the proportioning and addition of heat-sensitive raw materials and additives should be done batchwise by means of an intermittent weighing or volume measurement procedure or continuously.

For implementation of the procedure according to the invention it is advantageous to provide in sequence at least one evaporator, preferably of multistage type,
one proportioning and dispensing apparatus, designed for intermittent or continuous operation,
one pH-meter, designed for supervision and control of the process,
one heat exchanger, preferably of scraper or tubular type, for heating of the mixture by the use of steam,
one holding tank device or holder cell for holding a specific volume of the mixture for a predetermined time at a predetermined temperature,
one homogenizer or other equipment designed to comminute the constituents of the mixture, chiefly precipitated proteins,
one cooling device, preferably of flash type, designed to cool off the product instantaneously or very quickly, and
one product tank for accommodation of the product prior to its packaging.

The FIGURE of the drawing is a flow diagram showing the function of the apparatus.

The invention will now be described with reference to the attached drawing. The whey is brought into a conventional multistage evaporator 1, preferably furnished with a final thickener, for concentration to a T.S. content of 40–80% depending on the desired product. The evaporator is controlled by a device 2 which continuously measures the density, which is proportional to the T.S. content in the whey concentrate. In this way a raw material is obtained with predetermined and constant T.S. content, which is of great significance for the consistency and quality of the final product. A too low concentration results in loose final products and too high a concentration results in hard, viscous or gluey final products.

The concentrate is then led continuously through a pipe 3 to a buffer tank 4 containing an agitator mechanism 5. From the tank the concentrate is then pumped by a pump 6 through a pipe 7 intermittently to a weighing tank 8, where dispensing and addition of different substances take place batchwise as described below. This addition as well, however, can be done by dispensing "on line", i.e. continuously.

The weighing tank 8 consists of a container 9 supported by force-sensing elements 10 containing measuring devices for electronic weighing and dispensing equipment. Depending on the desired final product raw materials are added to the weighing tank 8 which are not heat-sensitive, e.g. cream, butter-fat, sugar or sorbitol. This is done through pipes 11, 12, 13 and 14, the three latter of which are combined in a common pipe 15 to the weighing tank.

In this stage of the production process the acidity is also adjusted to the desired pH-value by addition of NaOH or other pH-adjusting agent. The pH-value is adjusted between the limits 5.8 and 6.8, but preferably between 5.8 and 6.2. Too low a dosage of the pH-adjusting agents results in a tendency toward a sourish taste in the final product. Too high a dosage of the pH-adjusting agent produces a final product with an unpleasant extraneous flavor and a darker color. The concentrate and the added ingredients are kept in movement and mixed by an agitator 16 in the container 9. The resulting pH-value can be read on a measuring and control instrument 17, which controls a dispensing pump 18 for pH-adjusting agent.

When the batch has been dispensed it is pumped by pump 19 through the pipe 20 to a buffer tank 21 with an agitator 22. The mixture thus enters this tank intermittently, whereas the outflow from the tank is continuous. The pump 23 pumps the mixture from tank 21 through pipe 24 to a heat exchanger 25 of 3-stage type. The temperature is raised in step I to about 85° C.; in step II, to about 100° C.; and in step III, to over 100° C.

In general, the temperature of the mixture at the entry to the heat exchanger is about 60° C. and at its outlet about 100° C. As the concentrate is viscous, the heat exchanger should be of scraper or tubular type. On heating to about 100° C. for about one hour, the whey proteins are precipitated.

From the heat exchanger the mixture is taken through a pipe 26 to three parallel or shunted pipes 26a, 26b, 26c, which intermittently and alternately can lead the concentrate to three containers 27a, 27b, 27c furnished with agitators. Additives such as flavorings, preservatives and, e.g., ferro-gluconate, can be added to the mixture in the various containers through a feed pipe 28 with branch or shunt pipes 28a, 28b, 28c.

The continuous flow of mixture through pipe 26 can thus be led alternatively and intermittently to one of the three tanks. The mixture can be kept in the holding tank for the time required for the desired product and in this stage of the process one can, for example, obtain the desired color and taste of the final product. The holding time in the tanks can be varied from a few minutes to a few hours depending on the volume of the tanks and on the capacity of the other equipment. The holding tanks have a heating jacket and thermostat in order to be able to keep the temperature of the mixture constant.

After this stage the mixture is pumped through outlet pipes 29a, 29b, 29c and through a common pipe 29 by the pump 30 to a homogenizer 31. This comminutes the precipitated whey proteins at a pressure of 2–15 MPa.

The product is then taken through pipe 32 to a cooler 33, where very rapid cooling takes place so as to obtain small and uniform lactose crystals, which is essential for the consistency of the product. After being cooled, the temperature of the product should be between 5° and 40° C., preferably between 15° and 20° C. A vacuum cooler or a scraper heat exchanger is used for this cooling process.

After being cooled down the product is pumped by a pump 34 through pipe 35 to a product tank 36, preferably with agitator 37. The final product is collected in the tank and then taken out through the outlet 38 for packing.

This dispensing of the heat-sensitive additives, which is done through pipe 28, can instead be done "on line", i.e. continuous dispensing before homogenization and cooling.

In general:

A lower temperature in the heat exchanger gives a paler product with a loose consistency;

A higher material flow gives a paler product with a loose consistency;

A normal temperature in the heat exchanger, i.e. about 95° C., gives a normal product color and a normal consistency when combined with flow rates of 1800 kg/h;

A maturing time of about 30 min.

A high temperature in the heat exchanger combined with a normal rate of flow or a low rate of flow gives dark products having a slight extraneous flavor.

For manufacture of whey-cheese, a higher T.S. content is desired, so that additional evaporation is required. After the concentration in the multistage evaporator to about 60% T.S., the concentration continues in a subsequent evaporator, specially designed for the purpose, to about 80% T.S. For whey-cheese manufacture, the product is cooled only to about 60° C. in the first stage and is then packed and finally cooled to about 20° C.

As noted, apart from whey from cheese or caseinate made from cow's milk as raw material for manufacture of whey products by the described procedure, whey from goat-cheese manufacture can also be used. So can mixtures of these types of whey, or cow's or goat's milk added to them. Whey from cheese or caseinate manufacture from milk or other domestic animals may also be used.

Whey can moreover be used as raw material after having been wholly or partly deionized and/or wholly or partly hydrolyzed in order to obtain qualities of taste, color and consistency desired in the final product. The final product is an eatable, whey based creamy to brownish product, ready to eat or to be served without any further preparation such as cooking, heating, mixing with other foodstuffs, dilution, etc. There are two main types of products:

WHEY BUTTER

This product is a viscous product that is spreadable on, e.g., a piece of bread.

WHEY CHEESE

This product is a rather solid product which may be cut like cheese with a knife or a cheese-slicer, but there are some kinds which, in spite of being rather solid, still may be spread on a piece of bread e.g. by a knife. In this case, the consistency may be compared with that of a baked liver pâté.

The procedure according to the invention has distinct advantages over the technique known today:

(1) Smaller labor requirement, so lower labor cost per unit of weight of product.

(2) Smaller space requirement, so lower investment cost.

(3) Better working environment with, inter alia, less noise.

(4) The evaporation stage requires less energy and is thus more economical.

(5) Control of T.S. content, pH, temperature and holding times for the mixture yields a better-quality and more uniform product.

(6) All production apparatus is suited for cleaning in place (CIP), i.e. cleaning of the apparatus is simpler, cheaper and quicker.

In summary, there are two main differences between the prior art and the present invention. According to the invention, there is achieved a correct TS-value of the whey concentration, i.e., no further evaporation is necessary during the following specific discrete process steps. The continuous, easy to control flow of the material during processing is another main difference between the old and the new processes.

The processing to obtain the two main products—whey butter and whey cheese—is rather identical, the main difference being that the initial concentration of whey dry substances is increased to 60–80% for the processing to whey cheese. This is necessary in order to get the predetermined consistency—a rather solid, cheese-like product.

The following exemplify the invention, and are not to be taken as limiting same:

EXAMPLE 1

This example refers to processing to obtain whey *butter*. In specifying this process, reference is made to the drawing and to the numerals of the various units.

In producing whey butter, the whey is evaporated in the evaporator 1 to a TS-content of 57%, the concentrate leaving the evaporator at a temperature varying between 55° and 60° C. The concentrate is then passed through the buffer tank 5 by the pump 6 to the weighing tank 8. When introduced into the tank 8, the concentrate has cooled off but still has a temperature within the range of 50° to 60° C. In the tank 8, the whey concentrate is mixed with non-heat sensitive additives, as follows:

| Whey concentrate (TS 57%) | 2.3 tons |
|---|---|
| Fat of butter type | 150 kgs |
| Sugar | 150 kgs |

The acidity of the mixture is adjusted to a pH of 5.8 by introducing aqueous NaOH solution. The pump 19 then transfers the mixture to the buffer tank 21, from which the pump 23 transfers the mixture to a heat exchanger 25. The pumps 19 and 23 have a material flow of 1800 kg/h.

When reaching the heat exchanger 25, the temperature of the mixture is in the lower part of the range from 50° to 60° C. The heat exchanger is of 3-stage type. In the first stage the temperature is raised to 85° C. and in the second step the temperature is raised to 100° C. and to 106° C. in the third stage, and the mixture is then transferred successively to the tanks 27a to 27c, in which the temperature is about +95° C. Into the maturing tanks 27 there are added heat sensitive additives in the following amounts:

| Iron salt | 50 mg/kg mixture |
|---|---|
| Vanilla flavoring | 500 g/ton mixture |
| Preservatives | 1 g/kg mixture |

The temperature of the maturing tank is about +95° C. and the process time from filled-up tank to leaving same is 30 minutes.

The mixture is pumped by pump 30 to homogenizer 31 and cooler 33 where the product is cooled off to a temperature of about +18° C. and pumped by pump 34 to the product tank 36. The product then has the consistency of a paste and is dispensed through pipe 38 and filled into packages, generally consisting of boxes of impregnated paper or board or of plastic material and having a lid or cover.

The product is very viscous like a paste, has a light-brown color, a vague taste of milk sugar and vanilla and is spreadable onto a slice of bread.

EXAMPLE 2

The production of a whey *cheese* includes the same materials and additives and also follows the same process stages as with the production of whey butter but with the following exceptions: The TS-content—whey concentration—amounts to 70% instead of 57%. The same process stages are followed up to the weighing tank 8, in which the mixed material is composed as follows before being pumped out from the tank:

| Whey concentrate (TS 70%) | 2,3 ton |
|---|---|
| Fat of butter type | 200 kg |
| Sugar | 100 kg |
| NaOH, adjusting pH to | 5.8 |

Material flow, temperatures, additives to the mixture in the maturing tank 27, temperature and maturing time in these tanks are the same as with the whey butter production. The mixture may then be pumped by pump 30 through a homogenizer 31 and pumped to the product tank 36. Instead of having a temperature of +18° C. in this tank as with the whey butter, the whey cheese has a temperature of about +60° C. The reason for this is that the mixture must have a consistency suitable for packaging purposes. The mixture is dispensed directly into the final package, ready for delivery after cooling to about 20° C. The product has a consistency comparable to cheese, a light brownish color, a vague taste of milk sugar and vanilla, can be cut or sliced to be put onto a slice of bread.

EXAMPLE 3

This example refers to processing to produce whey butter following a modern (prior art), batch-wise manufacture of whey products.

According to this process, whey having a TS-content of 6% is evaporated in an evaporator increasing the TS-content to 42%. 480 kg of the concentrated whey is transferred to a cauldron.

Into the cauldron are added 22 kg of fat of butter type. The acidity is adjusted to a value of 60°Th (Thörner) by adding NaOH.

The cauldron is then heated to boiling at atmospheric pressure for precipitation of the whey proteins. The boiling takes place for about 10 minutes at +100° C. To determine when the precipitation is sufficient, visual inspection is used.

Following the precipitation, the lid of the cauldron is shut and the mixture is further evaporated under vacuum to a TS-content of 60%. Evaporation takes place during about 1 hour and at a temperature of +85° to +90° C. To determine when a TS-content of 60% is reached, the amount of power consumed for agitating is used, based on experience.

During boiling and evaporation, the mixture attains a brownish color. The last part of this process, of course, does not permit visual inspection.

After evaporation, the mixture is transferred, —pumped—to a tank with an agitator to mix-in additives. The following additives are introduced:

| 22 kg sugar | |
|---|---|
| iron salt | to the same percentage |
| vanilla flavoring | as given in Examples 1 |
| preservatives | and 2 |

The mixture is kept in the tank for about 10 minutes at a temperature of +80° to +85° C.

The mixture is then transferred by pumping from the tank through a homogenizer for mechanical working and then pumped through a cooler to be cooled to +20° C. and to a product tank from which it is dispensed into the packages for whey butter.

EXAMPLE 4

Processing to obtain whey cheese according to modern (prior art) methods is achieved in the identical way as in Example 3, with the difference that the boiling and evaporation in the cauldron is carried out until a TS-content of 80% is reached. All additives are mixed in the cauldron.

When leaving the cauldron, the whey cheese mixture is cooled off to +60° C. in a first stage, at which temperature it is dispensed either into a mold or into a final package. In the last mentioned case, the mixture is allowed to cool off to +20° C. If the cheese mixture is poured into a mold, the cheese is further cooled to +6° to +8° C. in a refrigerated room overnight and is then cut to the proper sizes and put into envelopes or packages for distribution.

From the processing according to Examples 3 and 4, it can easily be seen that evaporation takes place in various repeated stages and that the "browning" of the product is achieved within more than one stage. It is also evident that the visual control of consistency, color, flavoring, etc. cannot be accurately reproduced from batch to batch, and that this process does not allow for a continuous feed-back to control TS-content, acidity, browning and other qualities, and thus gives end products of varying quality.

The process also is very laborious, depending on the batch being intermittently transferred between various equipment.

The embodiments of the invention exemplified above can be varied within the scope of the claims. This applies especially to the choice of components and apparatus, which in some respects may be of many alternative forms without thereby affecting the procedure according to the invention.

What is claimed:

1. A method for the production of eatable whey products, comprising the sequential steps of (1) concentrating whey obtained from the byproducts of milk of cows or goats to a total solids content of between 40–80% by weight,
(2) adding non-heat-sensitive raw materials selected from the group consisting of sugars and fats of butter type to said concentrate to form a mixture therewith,
(3) adjusting the acidity of said mixture by the addition of pH-regulating agents of food quality so as to obtain a pH of between 5.8 and 6.8,
(4) heating said pH-adjusted mixture at a temperature of between 85° and 140° C. for a time sufficient to precipitate the whey proteins,
(5) thereafter adding heat-sensitive additives selected from the group consisting of flavoring agents and preservatives to said mixture,
(6) maintaining the mixture at about 95° C. for about 30 minutes,
(7) mechanically working said mixture to homogenize said precipitated proteins therein, thereby forming a homogenized product,
(8) cooling the thus homogenized product to a temperature C, between 5° and about 60° and
(9) storing said product for a time sufficient to obtain a predetermined consistency.

2. The method according to claim 1, wherein said pH is adjusted in step 3 to between 5.8 and 6.2.

3. The method according to claim 1, wherein said mixture is cooled in step 8 to between 15° to 20° C.

4. The method according to claim 1, wherein said mixture is cooled in step 8 to about 60° C.

* * * * *